United States Patent
Aktas et al.

(10) Patent No.: US 11,959,799 B2
(45) Date of Patent: Apr. 16, 2024

(54) EXTINCTION RATIO FREE PHASE SENSITIVE OPTICAL TIME DOMAIN REFLECTOMETRY BASED DISTRIBUTED ACOUSTIC SENSING SYSTEM

(71) Applicant: ASELSAN ELEKTRONIK SANAYI VE TICARET ANONIM SIRKETI, Ankara (TR)

(72) Inventors: Metin Aktas, Ankara (TR); Toygar Akgun, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 659 days.

(21) Appl. No.: 17/259,686

(22) PCT Filed: Aug. 8, 2018

(86) PCT No.: PCT/TR2018/050423
§ 371 (c)(1),
(2) Date: Jan. 12, 2021

(87) PCT Pub. No.: WO2020/032878
PCT Pub. Date: Feb. 13, 2020

(65) Prior Publication Data
US 2021/0140814 A1 May 13, 2021

(51) Int. Cl.
*G01H 9/00* (2006.01)
*G01D 5/353* (2006.01)

(52) U.S. Cl.
CPC ......... *G01H 9/006* (2013.01); *G01D 5/35361* (2013.01)

(58) Field of Classification Search
CPC ...... G01D 5/35361; G01H 9/00; G01H 9/004; G01H 9/006
See application file for complete search history.

(56) References Cited

U.S. PATENT DOCUMENTS 8,537,345 B2  9/2013  Crickmore et al.
9,140,582 B2* 9/2015  Farhadiroushan .. G01M 5/0091
              (Continued)

FOREIGN PATENT DOCUMENTS

CN  106961069 A  7/2017
CN  107144339 A  9/2017
              (Continued)

OTHER PUBLICATIONS

David Hill, Distributed Acoustic Sensing (DAS): Theory and Applications, Frontiers in Optics/Laser Science, 2015, FTh4E.1.
(Continued)

*Primary Examiner* — Michael A Lyons
(74) *Attorney, Agent, or Firm* — Bayramoglu Law Offices LLC (57) ABSTRACT

A phase sensitive optical time domain reflectometry based distributed acoustic sensing system eliminating a degradation in a sensing performance encountered due to a finite extinction ratio of optical elements used to generate optical pulses is provided. A classical Optical Time Domain Reflectometer (OTDR) concept and a phase-OTDR concept are merged to generate an optic pulse for an interrogation with commercially available optic modulators. Characteristics of a light inside a fiber optic cable carry properties of both classical OTDR and phase-OTDR systems. The proposed solution does not require any modifications in a receiver part of the phase-OTDR systems and the proposed solution is used for any type of phase-OTDR system structure.

16 Claims, 3 Drawing Sheets

(56) References Cited

U.S. PATENT DOCUMENTS

| | | | |
|---|---|---|---|
| 2012/0188533 A1 | | 7/2012 | Crickmore et al. |
| 2020/0209020 A1* | | 7/2020 | Issa .................... G01D 5/35361 |
| 2020/0249075 A1* | | 8/2020 | Ma .......................... G02B 26/04 |

FOREIGN PATENT DOCUMENTS

| | | | | |
|---|---|---|---|---|
| GB | 2442745 A | | 4/2008 | |
| GB | 2469709 A | * | 10/2010 | ........... E21B 47/101 |
| GB | 2550789 A | | 11/2017 | |
| WO | 2016164002 A2 | | 10/2016 | |
| WO | 2017069724 A1 | | 4/2017 | |
| WO | 2017127212 A1 | | 7/2017 | |
| WO | 2018039046 A1 | | 3/2018 | |

OTHER PUBLICATIONS

A. V. Makarenko, Deep Learning Algorithms for Signal Recognition in Long Perimeter Monitoring Distributed Fiber Optic Sensors, IEEE International Workshop on Machine Learning for Signal Processing, 2016.

Metin Aktas et al., Deep Learning Based Multi-threat Classification for Phase-OTDR Fiber Optic Distributed Acoustic Sensing Applications, Proc. of SPIE, 2017, pp. 102080G-1-18, vol. 10208.

Juan C. Juarez et al., Distributed Fiber-Optic Intrusion Sensor System, Journal of Lightwave Technology, Jun. 2005, pp. 2081-2087, vol. 23, No. 6.

Juan C. Juarez et al., Field test of a distributed fiber-optic intrusion sensor system for long perimeters, Applied Optics, 2007, pp. 1968-1971, vol. 46, No. 11.

Zengguang Qin et al., Wavelet Denoising Method for Improving Detection Performance of Distributed Vibration Sensor, IEEE Photonics Technology Letters, Apr. 1, 2012, pp. 542-544, vol. 24, No. 7.

Yahei Koyamada et al., Fiber-Optic Distributed Strain and Temperature Sensing With Very High Measurand Resolution Over Long Range Using Coherent OTDR, Journal of Lightwave Technology, 2009, pp. 1142-1146, vol. 27, No. 9.

Chams Baker et al., Enhancement of optical pulse extinction-ratio using the nonlinear Kerr effect for phase-OTDR, Optics Express, Aug. 2016, pp. 19424-19434, vol. 24, No. 17.

Metin Aktas et al., A model-based analysis of extinction ratio effects on phase-OTDR distributed acoustic sensing system performance, Proc. SPIE 10526, Feb. 23, 2018, 105260Y-1-20.

* cited by examiner

EXTINCTION RATIO FREE PHASE SENSITIVE OPTICAL TIME DOMAIN REFLECTOMETRY BASED DISTRIBUTED ACOUSTIC SENSING SYSTEM

CROSS-REFERENCE TO THE RELATED APPLICATIONS

This application is the national stage entry of International Application No. PCT/TR2018/050423, filed on Aug. 8, 2018, the entire contents of which are incorporated herein by reference.

TECHNICAL FIELD

The present disclosure relates to a distributed acoustic sensing system structure to eliminate the degradation in distributed acoustic sensing performance encountered due to the finite extinction ratio of the optical elements that are used to generate optical pulses.

BACKGROUND

Fiber-optic distributed acoustic sensing (DAS) based on the phase-OTDR (Optical Time Domain Reflectometer) technique offers a robust and cost-effective solution for monitoring long linear assets, such as oil/gas pipelines, powerlines, railroad tracks and boundaries of medium to large size facilities. Fiber-optic DAS can use telecommunication grade fiber optic cables as both the sensing and transmission medium, making it immune to electromagnetic radiation and jamming. As these cables are typically buried underground, DAS based monitoring solutions are robust against manual tampering as well. Furthermore, unlike active sensing solutions such as day-light or IR-cameras, DAS does not require additional power lines to be deployed along the asset.

Phase-OTDR (or phase sensitive OTDR) is based on precise measurement of a physical phenomenon called Rayleigh scattering that is naturally observed in fiber optic cables [1]. In its simplest form, Rayleigh scattering can be thought of as the partial backscattering of light traveling in the fiber optic cable due to molecular level imperfections that act as micro mirrors, also known as scattering centers. Mechanical waves in proximity of a fiber optic cable can physically interact with the cable and cause small but measurable alterations in the naturally observed levels of Rayleigh scattering. By sensing and interpreting these fluctuations in the backscattered light, physical activities such as digging or walking in proximity of a buried fiber optic cable can be detected, and with proper signal processing even be classified [2], [3].

OTDR is based on sending pulses of incoherent light into a fiber optic cable and measuring the back reflected light intensity at the same cable end. Today, OTDR is widely used for distributed measurement of signal loss and detection of broken points along fiber optic cables. Traditional OTDR uses incoherent light and therefore can only measure intensity variations along the fiber; it cannot be used for detecting vibrations near the fiber optic cable unless vibrations cause physical damage on the fiber optic cable structure. In phase sensitive OTDR however, a highly coherent light source is used and reflections from different scattering centers interfere coherently to produce the detected optical power trace [4], [5], [6], [7]. When a mechanical vibration source physically interacts with a fiber optic cable, physical locations of the previously mentioned scattering centers are slightly changed. With the help of highly coherent laser source, mechanical vibration introduces varying phase shifts to light that is backscattered from different scattering centers. These phase shifts affect the cumulative interference pattern for the portion of the fiber optic cable, where mechanical vibrations are applied. As the interference pattern changes so does the resulting light intensity and this change is measured, hence the term phase sensitive OTDR.

Figure 1:
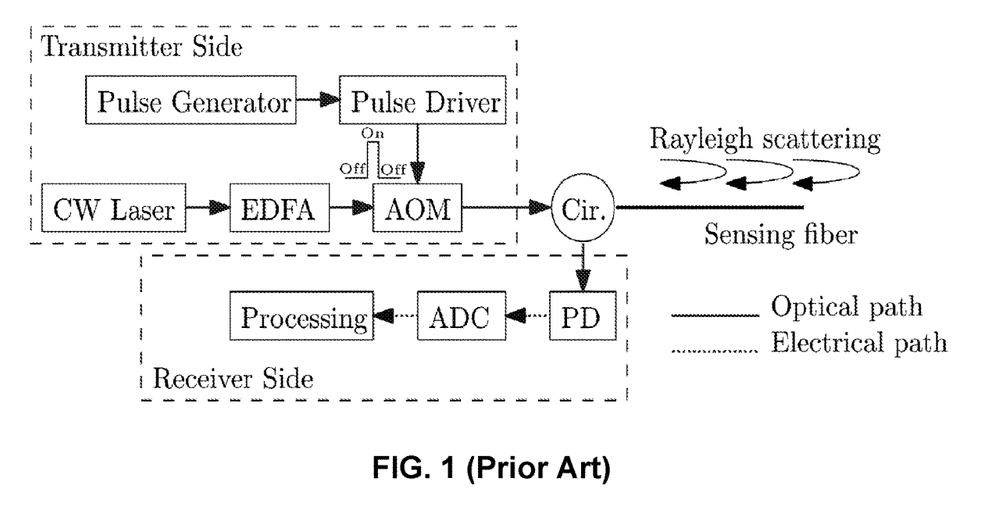
FIG. 1 illustrates the flow diagram of currently used classical phase-OTDR architecture in prior art.

A typical phase-OTDR DAS system is shown in FIG. 1. The light source is a narrow linewidth continuous wave (CW) laser with a specific wavelength selected based on the used fiber optic cable loss characteristics. The output of the laser is amplified by an Erbium doped fiber amplifier (EDFA). The amplified optical signal is then sent to the acousto-optic modulator (AOM), which is driven by the RF pulse signal generated by the pulse generator and pulse driver blocks, to create very narrow ($\approx$100 ns) optical pulses. Then, the generated optic pulses are sent into the sensing fiber through a circulator. The optical pulses traveling in the sensing fiber experience random Rayleigh scattering. Due to the high coherency of the laser source, the scattering signals with very similar frequency interfere coherently, which results in a random intensity optical signal. Any external acoustic disturbances acting on the fiber (that may be caused by walking, digging etc.) result in small optical phase changes on the backscattered light. These optical phase changes modulate the optic light intensity, which is detected by the photodetector (PD). The photodetected signal is digitized and processed.

Figure 2:
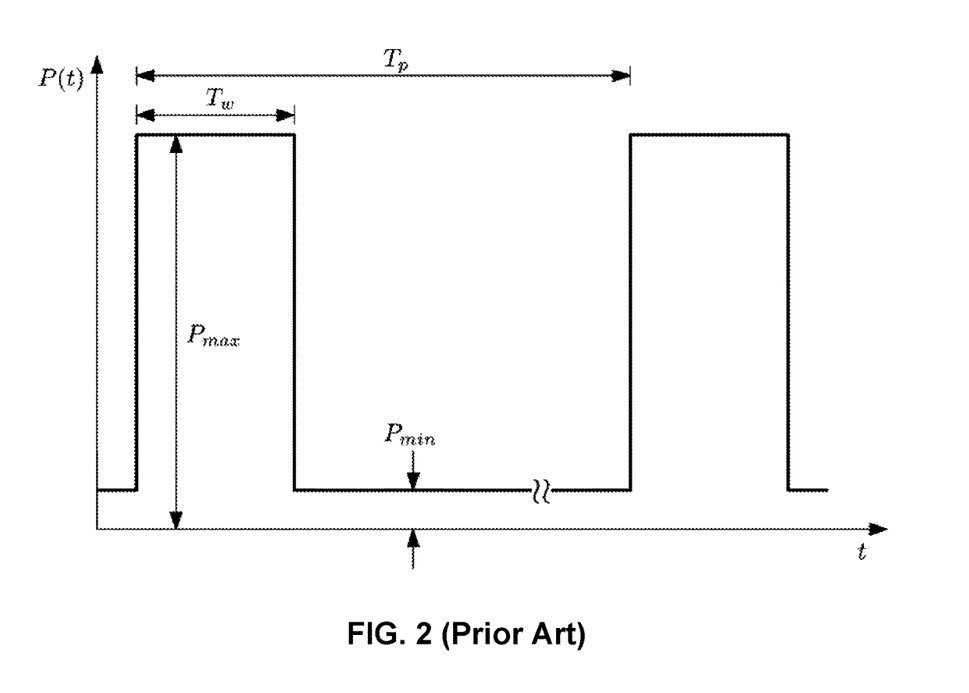
FIG. 2 shows optical pulses injected into the fiber optic cable, where $P_{max}$ and $P_{min}$ are the maximum and minimum optical power level that is injected into the fiber optic cable, respectively and $T_W$ and $T_P$ are pulse width and pulse repetition period, respectively.

In the commonly used phase-OTDR structure shown in FIG. 1, electro-optic modulators (EOM) can also be used instead of acousto-optic modulators (AOM) to obtain the interrogation pulses out of a continuous wave light source. In an ideal case, it is assumed that the parts of fiber optic cable that do not lie within the input light pulse are completely dark and there is no backscattered signal from the dark regions. On the other hand, both AOMs and EOMs do not satisfy this perfect shut-off assumption and there is always a small amount of the light at every point of the fiber optic cable at any time. In literature, this phenomenon is defined as the Extinction Ratio (ER), which is measured as the ratio of the maximum optical power level that is injected into the fiber optic cable (pulse ON) to the minimum optical power level (pulse OFF) as illustrated in FIG. 2.

In phase-OTDR, the aim of using short duration pulses is independently interrogating specific portions of the cable, where the length of the actively interrogated cable portion is specified by the optic pulse width. This is only possible when no light is injected into the fiber optic cable outside of the input light pulse. The unwanted leakage optical signal (pulse OFF state or $P_{min}$ in FIG. 2) invalidates the phase-OTDR sensing principal. In this case, the interrogated portions of the fiber optic cable cannot be independent, the activities on different portions of the cable may affect each other. In other words, at any time, the backscattered signals coming from the whole fiber optic cable interfere with each other, which affects the overall sensing performance, especially for long cables. As a result, ER is an inherent limiting factor that has a direct effect on the detection performance of phase-OTDR based DAS systems [8], [9].

In prior art, researchers try to solve the performance degradation problems in phase-OTDR systems encountered due to the finite Extinction Ratio (ER) in two different ways. Some researchers try to design better optical pulse generation mechanisms, in which the optic signal power in OFF state of the injected pulse is much lower than the commercially available EOMs or AOMs as stated in [8] and patent applications numbered CN106961069A and GB2550789A. On the other side, some researchers use the commercially available EOMS or AOMs and try the change the optical pulse sending structure in order to alleviate the effects of ER on system performance, as explained in GB2442745A, U.S. Pat. No. 8,537,345B2, WO2017069724A1, WO2018039046A1 and WO2017127212A1. Details of those methods will be given under the following sections.

Optic Pulse Generation with Higher Extinction Ratio

In the first solution camp, there are some works that propose to use more than one commercially available EOM and/or AOM in a cascaded manner to decrease the Extinction Ratio. While cascading two EOMs (or AOMs) with 30 dB extinction ratio can result in 60 dB extinction ratio, it cannot be guaranteed to obtain extremely low extinction ratio (i.e. 120 dB), which is required for a good performance for long fiber optic cable [9]. Indeed, there is no manufacturer that produces EOMs or AOMs with a guaranteed higher than 70 dB extinction ratio.

Instead of EOMs or AOMs, [8] proposes to use the nonlinear Kerr effect for optic pulse generation with extremely high extinction ratio. In this work, it is also theoretically shown that at least 90 dB extinction ratio is required for satisfying sensing performance at long fiber optic cables (>40 km).

In patent document numbered CN106961069A, a high extinction ratio periodic pulse signal generating system based on a feedback structure is introduced. A feedback circuit formed by an optical phase shifter, an optical amplifier, a time delay optical fiber, and an adjustable optical fiber delay line is used to feed a part of light output by a modulator back to the input end of the modulator. The optical couplers are used to couple optical signals output by a CW laser with the optical modulator, and then repeated modulation is realized. By changing the intensities and the phases of the feedback signals of the feedback circuit and the splitting ratios of the two optical couplers, the output of the periodic pulse signals satisfying peak power and extinction ratio requirements is realized.

In UK patent document no. GB2550789A, it is proposed to use optic shutter mechanism for reducing optical noise in distributed acoustic sensing system that will be used in wellbore. Shutter mechanism is derived by a controller operable to transmit a signal to the shutter to open the shutter for allowing an optical pulse to transmit through the shutter, and close the shutter for preventing an extraneous optical waveform. In that way, the unwanted leakage light due to finite extinction ratio values can be reduced. The shutter can be considered as cascading mechanism of multiple optic pulse generator and has the same limitations of EOMs or AOMs.

Degrading Effects of Extinction Ratio on Sensing Performance

In the second solution camp, researchers make an effort to change the mechanisms in the transmitter and/or receiver parts of the classical phase-OTDR sensing system in such a way that, the unavoidable leakage light does not affect the sensing performance. In these solutions, the commercially available EOMs or AOMs are used in an optical pulse generation mechanism with different approaches as compared to classical ones.

In GB patent no. GB2442745A, multiple groups of pulses with different frequencies are transmitted into the fiber optic cable to detect acoustic waves in the vicinity of buried optical fibers. In this document, the aim of using multiple pulses with different carrier frequencies is to mitigate the coherence fading problem, which is observed when the coherence length of the laser source is much larger than the pulse length. Multiple pulses provide redundancy and increase the probability that at least some of carriers are in a good condition for vibration sensing. This work requires careful selection of the carrier frequency differences between optic pulses and filter design to select the specific optic pulse pair at the receiver side.

In U.S. Pat. No. 8,537,345B2, temporally spaced multiple optic pulses possibly with different wavelengths are injected into the fiber optic cable. On the receiver side, the return signal is received in three different paths with different optical processes, which are two frequency shifted versions obtained with two different AOMs, and a delayed version obtained by a delay coil, before photodetectors. In this case, optic signals with different characteristics, i.e. normal phase-OTDR signal and the derivative of phase-OTDR signal, can be obtained with different carrier frequencies. Then, the derivative sensing technique can be applied to distributed acoustic sensing to increase the sensitivity as stated in the patent document. To apply the proposed solution, both the transmitter and receiver sides of the classical phase-OTDR system have to be changed. Also, the adjustment of temporal differences between injected pulses and the delay coil length can be very critical to obtain satisfying sensing performance. This work requires a careful selection of the carrier frequency differences between optic pulses and filter design to select the specific optic pulse pair at the receiver side.

In patent document no. WO2017069724A1, a sequence of optical pulses along an optical fiber of at least two different widths are used for interrogation to obtain a set of fade-resistant phase measurements. In another patent numbered WO2018039046A1, the proposed interrogation system transmits a sequence of M simultaneously propagating light pulses through the optical fiber using a spatial mode selected from a set of N spatial modes. The receiver side detects an environmental perturbation in the optical fiber based on an evaluation of a propagation of the sequence of M light pulses through the optical fiber.

The application numbered CN107144339A, a modulated pulse is used in interrogation process to realize accurate location and measurement of broadband vibration in a long-distance range. This work does not address the effects of leakage light on the system performance.

In patent WO2017127212A1, multiple optic pulses are transmitted into the multiple bundled fiber optic cables and spatial averaging of the back reflected signals received from these cables are computed to increase the signal to noise ratio (SNR). In this work, it is assumed that each spatial channel has an identical response to the acoustic vibrations and experiences the same phase of the acoustic vibrations. This assumption cannot be guaranteed.

All the works that use multiple optic pulses with different frequency/mode characteristics require careful selection of the carrier frequency/mode differences between optic pulses and filter designs to select the specific optic pulses at the receiver side.

SUMMARY

The invention aims to eliminate the degradation in sensing performance encountered due to the finite extinction ratio of the optical elements that are used to generate optical pulses. To do this, the classical OTDR and phase-OTDR concepts are merged to generate a modified optic pulse for interrogation with commercially available AOMs or EOMs. The characteristics of the light inside the fiber optic cable carry the properties of both classical OTDR and phase- OTDR systems. The proposed solution does not require any modifications in the receiver part of the phase-OTDR systems and can easily be used for any type of phase-OTDR system structure.

For a better understanding of the present invention, the basic characteristics of the laser source used in classical OTDR and phase-OTDR applications should be understood clearly. In a chronological order, at first classical OTDR was demonstrated for measuring signal loss and detecting broken points along fiber optic cables. It uses optic pulses generated from an incoherent continuous wave (CW) laser source for interrogation with a very similar system architecture as the phase-OTDR system that is shown in FIG. 1. Since the incoherent laser source has a large linewidth, the interfering back reflected optic signals due to the Rayleigh backscattering are at different frequencies. When there is a specific deformation on the fiber optic cable, the power of Rayleigh backscattered signal reflected back from that point is much larger than the power of Rayleigh backscattered signals reflected back from the other points. This is true regardless of the frequency of the reflected signal. Therefore, the incoherent laser source used in classical OTDR system is suitable for measuring intensity variations along the fiber optic cable. On the other hand, this system is not appropriate to sense small variations near or on the fiber optic cable. This type of activities result in very small changes (≈50 nm) on the positions of the scattering centers, which are simply the imperfections in the fiber optic cable core. The changes in the positions of the scattering centers result in phase shifts in the received backscattered signals. When the input laser source is incoherent, a change in the position of a single scattering center is observed as multiple phase shifts due to the multiple frequencies in the reflected signal. The interference of back reflected signals with varying random phases cancels out and the small vibration near or on the fiber optic cable cannot be sensed.

As the laser source manufacturing technology improved, it became possible to produce laser sources with very narrow linewidth (highly coherent laser source). Using a highly coherent laser source solves the signal cancellation problem due to incoherent interference, since all the back reflected signals are almost at the same frequency. In that case, a change in the position of a single scattering center can be measured as a single phase shift, making it possible to sense small vibrations. As a result, using a highly coherent laser source instead of an incoherent laser source makes the interrogation process sensitive to small vibrations along the fiber optic cable.

In practical use cases, there are always small vibrations along the fiber optic cable, apart from the target activity to be sensed. Under the infinite Extinction Ratio assumption, these spurious vibrations do not corrupt the measurements taken for the target activity. However, when the infinite Extinction Ratio assumption is violated, the undesired leakage light fills the full length of the fiber optic cable. As a result, the signals coherently interfering on the photodetector are not limited to those coming from section of the fiber optic cable that is illuminated by the ON state of the optic pulse. Potentially, back reflected light coming from anywhere on the fiber optic cable can coherently interfere on the photodetector, causing varying optical background noise.

While incoherent laser source used in classical OTDR applications is insensitive to the small changes along the fiber optic cable, the highly coherent laser source used in phase-OTDR applications is over sensitive to the small changes at the outside the area of interest and the sensitivity level depends on the value of the extinction ratio and the length of the fiber optic cable. Therefore, the optimum solution for developing a better distributed acoustic sensing system is to use both incoherent and coherent laser sources in a joint manner at phase-OTDR system architecture. The key point of this invention is to integrate the incoherent laser source into the pulse generation mechanism of the phase-OTDR system to make the system insensitive to the activities outside of the point of interest without decreasing the sensitivity at the point of interest.

The present invention differs from the existing solutions with:

It is simple to apply to the existent various phase-OTDR system architectures.
No modifications are required for the receiver side of the normal phase-OTDR systems.
There is no required strict timing accuracies as compared to the multiple optic pulses scenario.
There is no required algorithmic/software modifications to be used in the existent phase-OTDR systems.
There is no required electronic re-design in the existent phase-OTDR systems. It is realized with fully optic elements.

PART REFERENCES

10. Coherent laser source
20. First gain and filter block
30. Optic pulse generator
40. Radio frequency (RF) signal pulse generator
50. Combiner
60. Circulator
70. Sensing cable
80. Incoherent laser source
90. Second gain and filter block
100. Third gain and filter block
110. Photo detector
120. Analog to digital converter (ADC)
130. Processor
140. Frequency shifter
150. Phase shifter
160. Shifted signal combiner

DETAILED DESCRIPTION OF THE EMBODIMENTS

The invention is a phase sensitive optical time domain reflectometry based distributed acoustic sensing system that eliminates the degradation in sensing performance encountered due to the finite extinction ratio of the optical elements. In the system, a coherent laser source (10) generates CW laser with narrow linewidth (smaller than 100 Hz) for detecting vibration sources near a sensing cable (70). The phase-OTDR systems are based on measuring the changes in phase of the returned Rayleigh scattering signal and this measurement is possible when the light injected into the sensing cable (70) is coherent. Sensing cable (70) is a telecommunications grade fiber optic cable or any other type of fiber optic cable that can be used for remote sensing applications.

The first gain and filter block (20) amplifies and filters the laser in order to satisfy the power and coherency criteria of the light to be injected into the cable (70). The block (20) contains an optical amplifier/attenuator to adjust the power of the light to be injected into the cable (70). Optic power can be adjusted by using EDFA. The amplified signal is then filtered to remove undesired signal components that are due to the non-ideal behavior of the amplifier. Several different optical filter designs can be used in this block (20).

The optic pulse generator (30) shapes the CW laser into the narrow optic pulses 100 ns) with the desired pulse shape generated by RF signal pulse generator (40) for interrogation. The critical point in pulse generation is to obtain high extinction ratio, which is the ratio of the optic power within pulse (the ON state) and the optic power outside pulse (the OFF state). Optic pulse can be generated by using Acousto-optic Modulator (AOM) or Electro-optic Modulator (EOM) or any other optical component such as Kerr medium. The shape of the optic pulse can vary based on the application, i.e. rectangular pulse, saw tooth pulse, etc.

Figure 4:
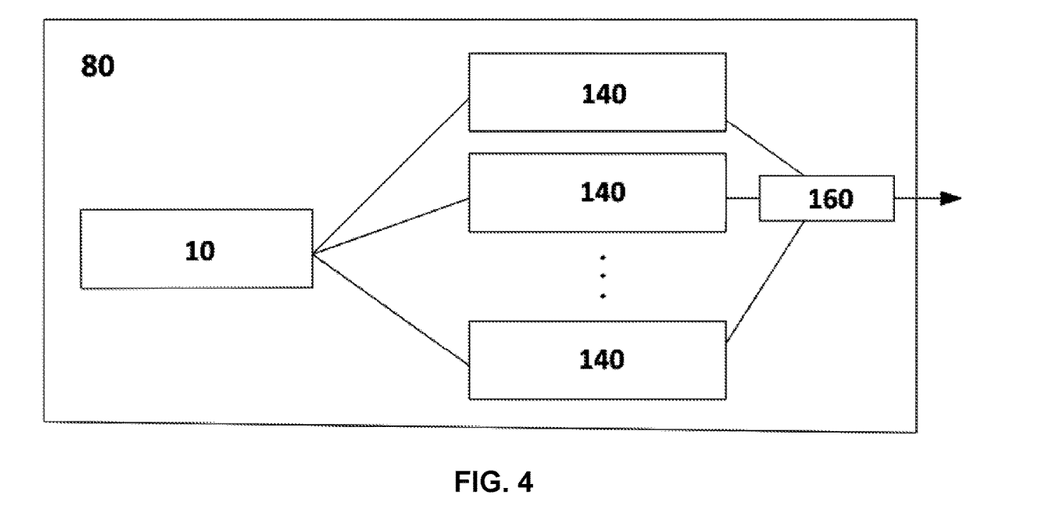
FIG. 4 shows CW laser with large linewidth constructed by multiple optic frequency shifters.
Figure 5:
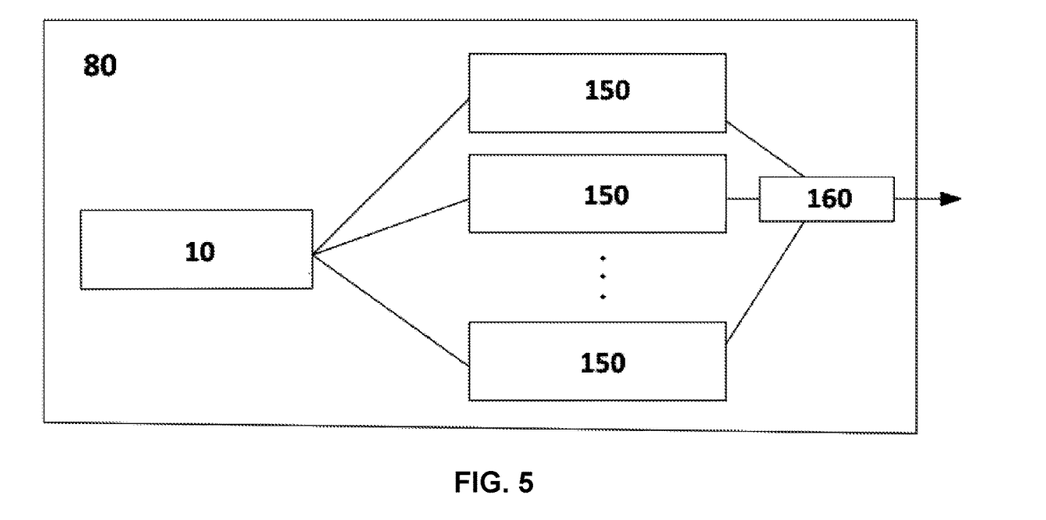
FIG. 5 shows CW laser with large linewidth constructed by multiple optic phase shifters.

On the other path, an incoherent laser source (80) generates CW laser with large linewidth for degrading the undesired coherent interference effect for the leakage light injected into the cable when optic pulse generator (30) is in OFF state. The incoherent laser source (80) can be constructed with:

- Laser sources that are commonly used in classical OTDR applications but not used in phase-OTDR applications due to the large linewidth,
- The combined multiple CW lasers with narrow linewidth as shown in FIG. 4. Frequency shifters (140) can shift the source laser frequency with a fixed value or shifting value can be changed with an external signal source.
- The combination of multiple different phase shifted versions of a single CW laser with narrow linewidth such in FIG. 5. Phase shifters (150) can shift the source laser phase with a fixed value or shifting value can be changed with an external signal source.
- All of the other possibilities for generating large linewidth laser can also be used throughout this design.

The second gain and filter block (90) amplifies/attenuates and filters the incoherent CW laser coming from the incoherent laser source (80) to satisfy the power and incoherency criteria. This part contains an optical amplifier/attenuator to adjust the power of the incoherent light injected into the sensing cable (70) such that its power is similar to the power of the coherent leakage light injected when the optic pulse generator (30) is in OFF state. Several different optical filter designs can be used in this block (90). This filter block should shape the frequency spectrum of the light injected into the sensing cable (70) such that the resulting incoherent light has a wide linewidth with a total power that is similar to the power of the coherent leakage light injected when the optic pulse generator (30) is in OFF state. For example, gain and filter block (90) can be constructed as a combination of first gain and filter block (20) combined with optic pulse generator (30) and RF signal pulse generator (40), where RF signal pulse generator (40) is always in OFF state.

The combiner (50) combines the optic signal coming from the optic pulse generator (30) and the second gain and filter block (90) and forwards the combined optic signal to a circulator (60). The circulator (60) injects the combined optic signal to the sensing cable (70) and forwards back reflected Rayleigh scattering signals coming from the sensing cable (70) to the third gain and filter block (100). The third gain and filter block (100) adjusts the power level of the returned Rayleigh backscattered signal and filters out the undesired frequency components in the returned Rayleigh backscattered signal for obtaining the best performance in the receiver block. The receiver block consists of a photo detector (110), an ADC (120) and a processor (130). The receiver block can be in the form of direct detection, heterodyne detection, homodyne detection or any other receiver format that can be used in distributed acoustic sensing applications. The photo detector (110) measures the optic power of the returned Rayleigh backscattered signal as an electrical signal (voltage or current). The photo detector block (110) may consist of a single photo detector or multiple photo detectors for measuring the returned Rayleigh backscattered optical signal based on the preferred embodiment. The ADC (120) digitizes the measured analog optic power to be processed by the processor (130). The single or multiple ADC (120) may be used for measuring based on the preferred embodiment.

Figure 3:
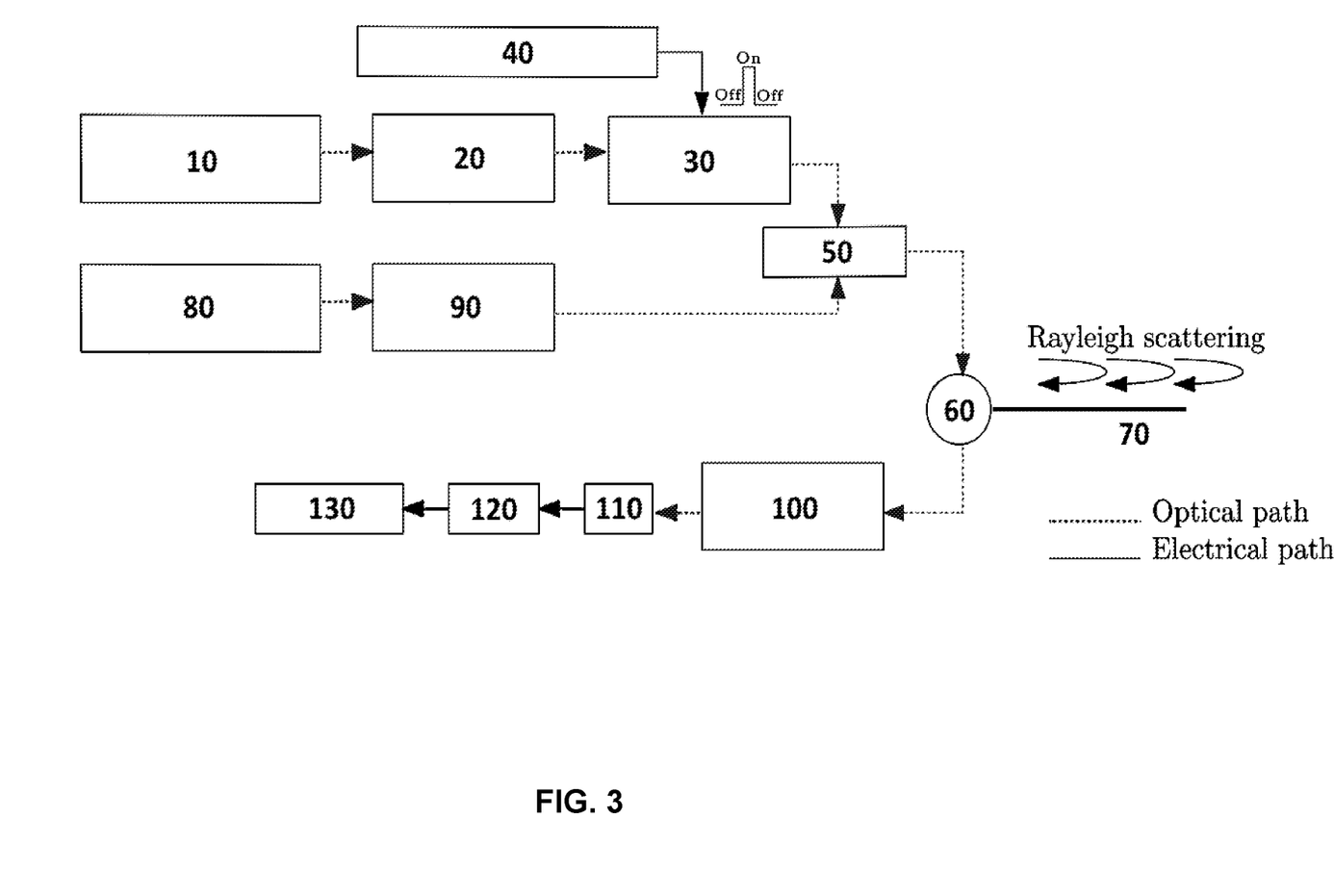
FIG. 3 is the diagram of extinction ratio free phase sensitive optical time domain reflectometry based distributed acoustic sensing system.

In the present invention, only the optic pulse generation mechanism of the phase-OTDR architecture is modified and the receiver side is not changed as shown in FIG. 3. A second path is added into the transmitter side to change the characteristics of the optical pulse injected into the sensing cable (70) for interrogation. On the second path, incoherent laser source (80) is used instead of the highly coherent one with the center frequency same as the coherent laser source (10) in the first path. In a possible implementation, the other optical and electronic parts may be kept identical to the first path. The optical signals generated at these two paths are combined by the combiner (50) and fed into the sensing cable (70). In this configuration, the AOM in the first path is driven by very narrow ($\approx$100 ns) electronic pulse with ON and OFF state and the AOM in the second path is driven continuously with OFF state. Therefore, while the first path generates optical pulse, the second path generates only the leakage optical signal with a much higher linewidth as compared to the optic signal in the first path.

The optic pulse injected into the sensing cable (70) can be represented as $$p(t) = \sum_{k=-\infty}^{\infty} \left[ f(t)\Pi\left(\frac{t-kT_p}{T_w}\right) + \epsilon_1 f(t)\left(1 - \Pi\left(\frac{t-kT_p}{T_w}\right)\right) + \epsilon_2 g(t) \right]$$

$$= \sum_{k=-\infty}^{\infty} \left[ (1-\epsilon_1)f(t)\Pi\left(\frac{t-kT_p}{T_w}\right) + \epsilon_1(f(t)+g(t)) + (\epsilon_2 - \epsilon_1)g(t) \right],$$

where f(t) and g(t) are the CW optic signals generated from highly coherent and incoherent laser sources (10, 80), respectively; $\epsilon_1$ and $\epsilon_2$ are the extinction ratio values of optic paths (AOMs in first and second path), respectively. The pulse repetition period is denoted as $T_P$ and $\Pi(.)$ represents a rectangular pulse that is defined as $$\Pi\left(\frac{t}{T_w}\right) = \begin{cases} 1, & 0 \le t \le T_w \\ 0, & \text{otherwise.} \end{cases}$$

Note that, when the AOMs have similar low extinction ratios, i.e., $\epsilon_1 \approx \epsilon_2 \ll 1$, the injected optic signal p(t) can be simplified as $$p(t) = \sum_{k=-\infty}^{\infty} \left[ f(t)\Pi\left(\frac{t-kT_p}{T_w}\right) + \epsilon(f(t) + g(t)) \right],$$

where $\epsilon = \epsilon_1 \approx \epsilon_2$. In that case, inserting incoherent laser signal g(t) to the normal phase-OTDR signal can be interpreted as contaminating the coherent leakage light with incoherent light. Since $\epsilon \ll 1$, the incoherent contamination does not alter the sensing performance of the system in the ON state of the optic pulse. On the other hand, it significantly changes the characteristics of the back reflected signal due to the leakage light injected into the fiber optic cable in the OFF state of the optic pulse. In the OFF state, while all the back reflected signals are almost the same frequency when g(t) does not exist, the back reflected signals are in random frequencies in a wide range when the g(t) is also injected. Then, our proposed system architecture becomes an interrogation unit using optic pulse with two states, i.e., coherent ON state and incoherent OFF state. The coherent ON state is the desired optic signal that is highly sensitive to the small vibrations near or on the fiber optic cable. On the other hand, the incoherent OFF state is unavoidable and the undesired leakage signal due to the AOMs or EOMs with finite extinction ratio that is insensitive to the small vibrations near or on the fiber optic cable. Therefore, in the proposed system configuration, the small vibrations that are on the outside the area of the interrogating region with ON state of the optic pulse do not affect the sensing performance as compared to the fully coherent phase-OTDR system.

REFERENCES

[1] Hill, D., "Distributed acoustic sensing (das): Theory and applications," in [*Frontiers in Optics* 2015], *Frontiers in Optics* 2015, FTh4E.1, Optical Society of America (2015).

[2] Makarenko, A. V., "Deep learning algorithms for signal recognition in long perimeter monitoring distributed fiber optic sensors," *IEEE 26th Int. Workshop on Machine Learning for Signal Processing (MLSP)*, 1-11 (2016).

[3] Aktas, M., Akgun, T., Demircin, M. U., and Buyukaydin, D., "Deep learning based multi-thread classification for phase-otdr fiber optic distributed acoustic sensing applications," in [*Fiber Optic Sensors and Applications XIV*], *Proc. SPIE* 10208 (2017).

[4] Juarez, J. C., Maier, E. W., Choi, K. N., and Taylor, H. F., "Distributed fiberoptic intrusion sensor system," *J. Lightw. Technol.* 23, 2081-2087 (2005).

[5] Juarez, J. C. and Taylor, H. F., "Field test of a distributed fiber-optic intrusion sensor system for long perimeters," *Applied Optics* 46, 1968-1971 (2007).

[6] Qin, Z., Chen, L., and Bao, X., "Wavelet denoising method for improving detection performance of distributed vibration sensor," *IEEE Photonic Tech. Lett.* 24, 542-544 (2012).

[7] Koyamada, Y., Imahama, M., Kubota, K., and Hogari, K., "Fiber-optic distributed strain and temperature sensing with very high measurand resolution over long range using coherent otdr," *J. Lightw. Technol.* 27, 1142-1146 (2009).

[8] Baker, C., Vanus, B., Wuilpart, M., Chen, L., and Bao, X., "Enhancement of optical pulse extinction-ratio using the nonlinear Kerr effect for phase-otdr," *Optics Express* 24, 19424-19434 (2016).

[9] M. Aktas, H. M. and Akgun, T., "A model-based analysis of extinction ratio effects on phase-OTDR distributed acoustic sensing system performance," *SPIE Photonics West* (2018).

What is claimed is:

1. A phase sensitive optical time domain reflectometry based distributed acoustic sensing system eliminating a degradation in a sensing performance encountered due to a finite extinction ratio of optical elements, comprising:

a coherent laser source generating a coherent Continuous Wave (CW) laser beam with a first linewidth for detecting vibration sources near a sensing cable, a first gain and filter block amplifying the coherent CW laser beam to adjust a power and filtering the coherent CW laser beam to be injected into the sensing cable to eliminate at least some frequency components that are introducible during a power adjustment, an optical pulse generator shaping the coherent CW laser beam into optical pulses with a pulse shape generated by a Radio Frequency (RF) signal pulse generator, a circulator injecting an optical signal to the sensing cable and forwarding back reflected Rayleigh scattering signals coming from the sensing cable to a third gain and filter block, the third gain and filter block adjusting a power level of the optical signal and filtering out the at least some frequency components on a returned Rayleigh backscattered signal, a receiver block measuring an optical power of the returned Rayleigh backscattered signal, digitizing a measured analog optical power and processing a digitized optical signal power, the phase sensitive optical time domain reflectometry based distributed acoustic sensing system further comprising;

an incoherent laser source generating an incoherent CW laser beam with a second linewidth, which is larger than the first linewidth, for degrading a coherence interference effect or a coherence length for a light injected into the sensing cable when the optical pulse generator is in an OFF state, a second gain and filter block adjusting a power of an incoherent light and filtering the incoherent light, wherein a resulting incoherent light has a linewidth with a power of the resulting incoherent light that mimics a power of a coherent leakage light injected when the optical pulse generator is in the OFF state, a combiner combining the optical signal coming from the optical pulse generator and the second gain and filter block and forwarding the optical signal to the circulator.

2. The phase sensitive optical time domain reflectometry based distributed acoustic sensing system according to the claim 1, wherein an optical pulse, p(t), injected into a fiber optic cable is represented as follows:

$$p(t) = \sum_{k=-\infty}^{\infty} \left[ f(t)\Pi\left(\frac{t-kT_p}{T_w}\right) + \epsilon_1 f(t)\left(1 - \Pi\left(\frac{t-kT_p}{T_w}\right)\right) + \epsilon_2 g(t) \right]$$

$$= \sum_{k=-\infty}^{\infty} \left[ (1-\epsilon_1)f(t)\Pi\left(\frac{t-kT_p}{T_w}\right) + \epsilon_1(f(t) + g(t)) + (\epsilon_2 - \epsilon_1)g(t) \right],$$

wherein f(t) and g(t) are CW optical signals generated from the coherent laser source and the incoherent laser source, respectively; $\epsilon_1$ and $\epsilon_2$ are extinction ratio values of optical paths along the fiber optic cable, respectively; $T_P$ is a pulse repetition period and $\Pi(.)$ represents a rectangular pulse, wherein the rectangular pulse is defined as:

$$\Pi\left(\frac{t}{T_w}\right) = \begin{cases} 1, & 0 \leq t \leq T_w \\ 0, & \text{otherwise.} \end{cases}$$

3. The phase sensitive optical time domain reflectometry based distributed acoustic sensing system according to the claim 2, wherein the optical pulse p(t) is simplified as follows:

$$p(t) = \sum_{k=-\infty}^{\infty} \left[ f(t)\Pi\left(\frac{t-kT_p}{T_w}\right) + \epsilon(f(t) + g(t)) \right],$$

when extinction ratios are similar and $\epsilon = \epsilon_1 \approx \epsilon_2 \ll 1$, thus the phase sensitive optical time domain reflectometry based distributed acoustic sensing system becomes an interrogation unit using the optical pulse with two states, comprising a coherent ON state and an incoherent OFF state.

4. The phase sensitive optical time domain reflectometry based distributed acoustic sensing system according to the claim 1, wherein the optical pulse generator is an acousto-optical modulator or an electro-optical modulator or a Kerr medium.

5. The phase sensitive optical time domain reflectometry based distributed acoustic sensing system according to the claim 1, wherein the optical power is adjusted by using an Erbium Doped Fiber Amplifier in the first gain and filter block, the second gain and filter block and the third gain and filter block.

6. The phase sensitive optical time domain reflectometry based distributed acoustic sensing system according to the claim 1, wherein the receiver block consists of a photo detector measuring the optical power, an analog to digital converter and a processor processing the digitized optical signal power.

7. The phase sensitive optical time domain reflectometry based distributed acoustic sensing system according to the claim 6, comprising a photo detector block consisting of a single photo detector or multiple photo detectors for measuring the returned Rayleigh backscattered signal.

8. The phase sensitive optical time domain reflectometry based distributed acoustic sensing system according to the claim 1, comprising a photo detector block consisting of a single photo detector or multiple photo detectors for measuring the returned Rayleigh backscattered signal.

9. The phase sensitive optical time domain reflectometry based distributed acoustic sensing system according to the claim 1, wherein the receiver block is in a form of a direct detection, a heterodyne detection, a homodyne detection or a receiver format used in a distributed acoustic sensing.

10. The phase sensitive optical time domain reflectometry based distributed acoustic sensing system according to the claim 1, wherein the incoherent laser source is a combination of multiple CW laser beams with the first linewidth shifted with optical frequency shifters.

11. The phase sensitive optical time domain reflectometry based distributed acoustic sensing system according to the claim 10, wherein the optical frequency shifters shift a laser frequency with a fixed value or a shifting value changed with an external signal source.

12. The phase sensitive optical time domain reflectometry based distributed acoustic sensing system according to the claim 1, wherein the incoherent laser source is a combination of multiple CW laser beams with the first linewidth shifted with optical phase shifters.

13. The phase sensitive optical time domain reflectometry based distributed acoustic sensing system according to the claim 12, wherein the optical phase shifters shift a laser phase with a fixed value or a shifting value changed with an external signal source.

14. The phase sensitive optical time domain reflectometry based distributed acoustic sensing system according to the claim 1, wherein the sensing cable is a fiber optic cable.

15. The phase sensitive optical time domain reflectometry based distributed acoustic sensing system according to the claim 1, wherein the second gain and filter block is realized with the first gain and filter block combined with the optical pulse generator and the RF signal pulse generator, wherein the RF signal pulse generator is always in the OFF state.

16. A phase sensitive optical time domain reflectometry based distributed acoustic sensing method eliminating a degradation in a sensing performance encountered due to a finite extinction ratio of optical elements, comprising the steps of;
    generating a coherent Continuous Wave (CW) laser beam with a first linewidth for detecting vibration sources near a fiber optical cable,
    adjusting a power of the coherent CW laser beam and filtering to eliminate at least some frequency components that are introducible during a power adjustment,
    shaping the coherent CW laser beam into optical pulses by an optical pulse generator with a pulse shape,
    generating an incoherent CW laser beam with a second linewidth, which is larger than the first linewidth, for degrading a coherence interference effect or a coherence length for a light injected into the fiber optical cable when the optical pulse generator is in an OFF state,
    adjusting a power of an incoherent light and filtering the incoherent light, wherein a resulting incoherent light has a linewidth with a power of the resulting incoherent light that mimics a power of a coherent leakage light injected when the optical pulse generator is in the OFF state,
    combining optical signals coming from optical paths with a combiner and forwarding the optical signals to a circulator,
    injecting the optical signals to the fiber optic cable and forwarding back reflected Rayleigh scattering signals coming from the fiber optic cable to a gain and filter block,
    adjusting a power level of the optical signals and filtering out the at least some frequency components on a returned Rayleigh backscattered signal,
    measuring an optical power of the returned Rayleigh backscattered signal,
    digitizing a measured analog optical power and processing a digitized optical signal power.

* * * * *